T. W. OWEN.
ROLLER BEARING.
APPLICATION FILED NOV. 14, 1916.

1,225,266.

Patented May 8, 1917.
3 SHEETS—SHEET 1.

WITNESSES

INVENTOR
Thomas W. Owen

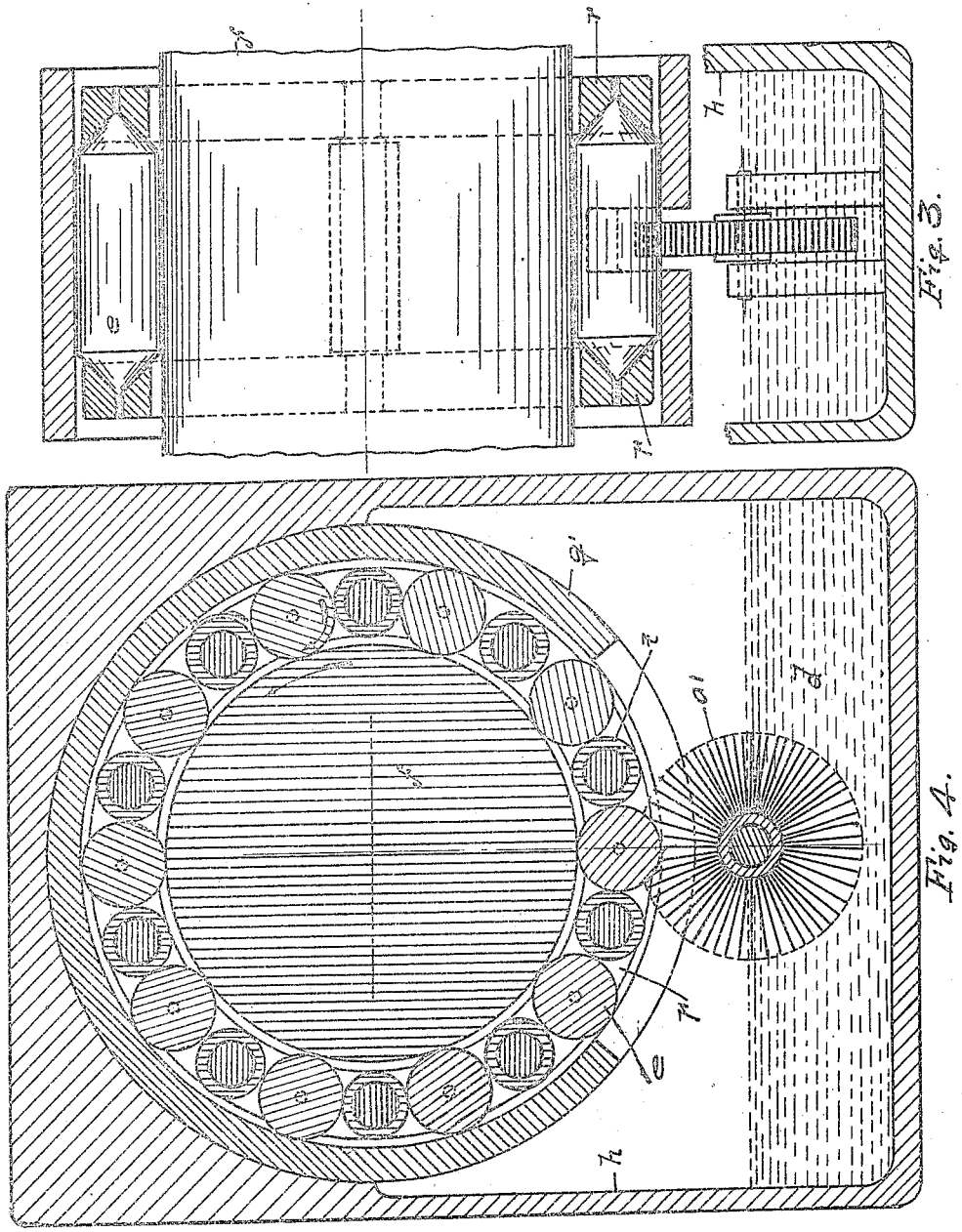

UNITED STATES PATENT OFFICE.

THOMAS W. OWEN, OF PITTSBURGH, PENNSYLVANIA.

ROLLER-BEARING.

1,225,266.  Specification of Letters Patent.  Patented May 8, 1917.

Application filed November 14, 1916. Serial No. 131,247.

*To all whom it may concern:*

Be it known that I, THOMAS W. OWEN, a resident of Pittsburgh, in the county of Allegheny and the State of Pennsylvania, have invented a new and useful Improvement in Roller-Bearings; and I do hereby declare the following to be a full, clear, and exact description thereof.

My invention relates to roller bearings for car journals, vehicle axles and shafts revolving at a high rate of speed and subjected to heavy loads.

The object of my invention is to increase the efficiency and wear of this kind of devices.

The invention also comprises details of construction, which will be hereinafter described and claimed.

Figure 1:
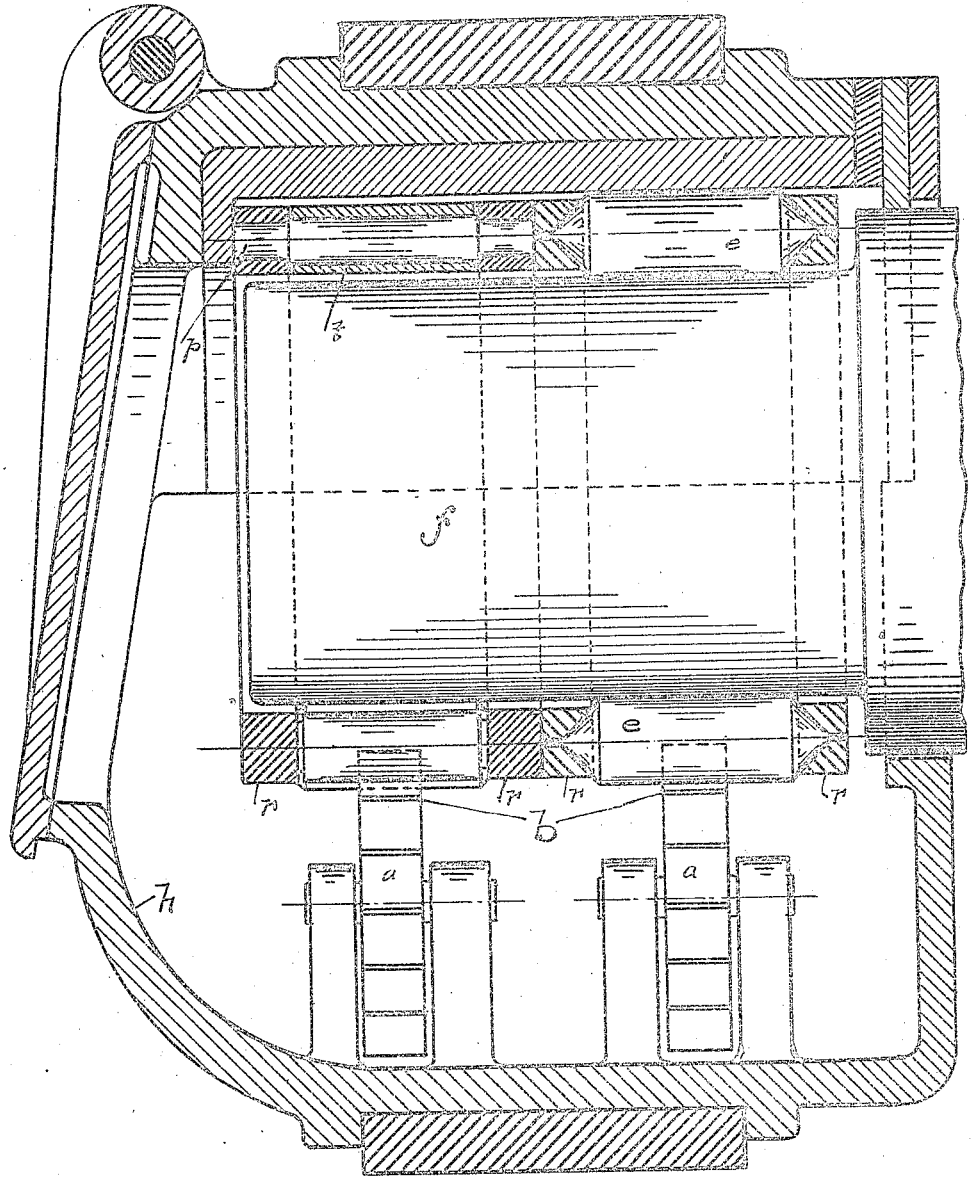
Figure 2:
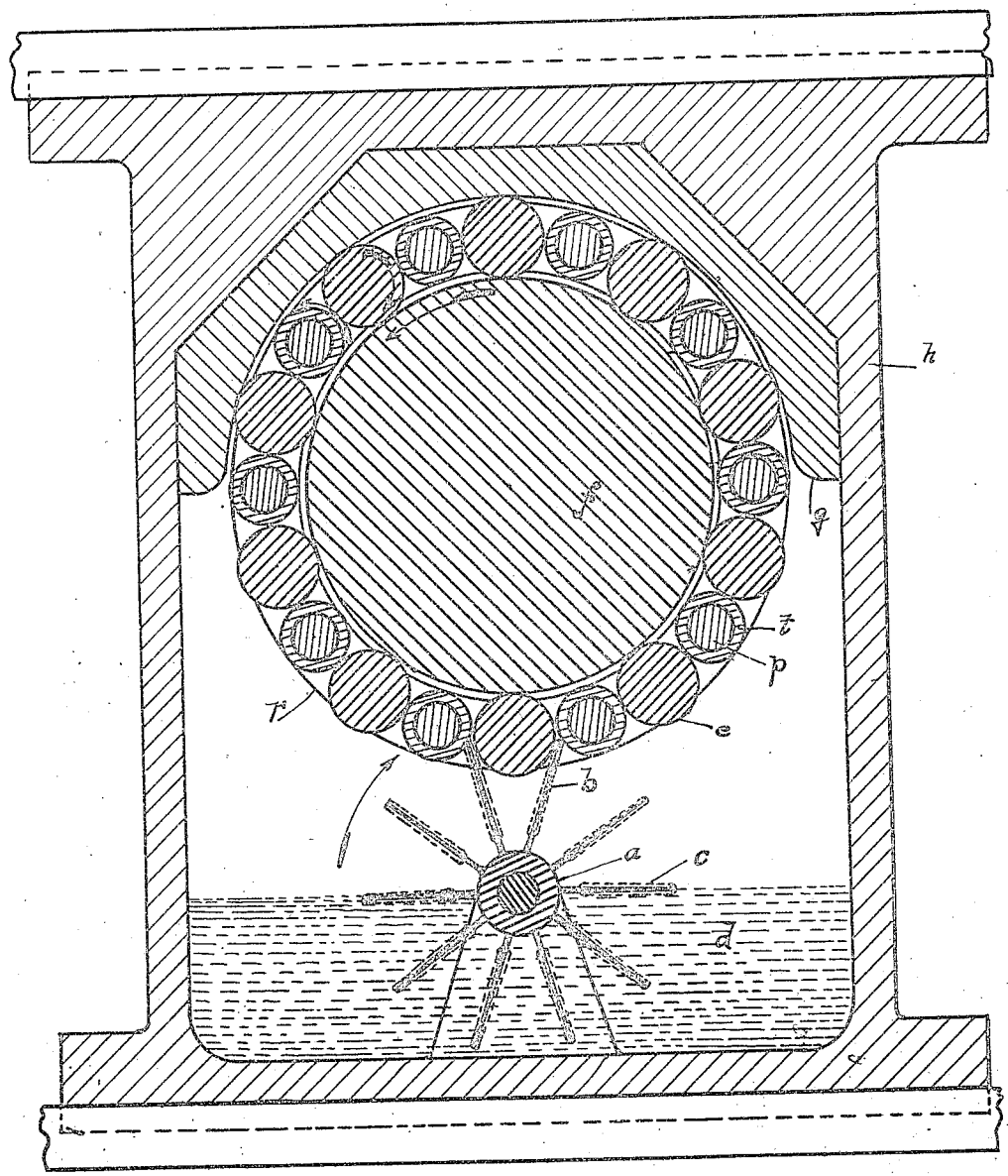

In the accompanying drawings, in which I show preferred forms of my invention, Figure 1, is a section through a car journal bearing and Fig. 2, cross section of same, showing a double caged roller bearing. The sectional view Fig. 3, represents an axle or shaft bearing with its cross sectional view Fig. 4.

Like letters of reference indicate like parts in each view.

In the employment of my invention for journals I show a multiple cage roller bearing in connection with an oiling device, consisting of the paddle wheels "a" the blades "b" of which may be lined with a material "c" having capillary attraction to oil, such as felt.

The paddle wheel is to be mounted in the oil reservoir "d" and is in mesh with the rollers "e" and "f" carrying the oil from axle "f" to the bearings "g" of the journal box "h".

In the employment of my invention for bearings Fig. 3 and Fig. 4, in which the axle or shaft rotates in a bushing "g" I have selected to show a single cage roller bearing unit, in connection with a brush wheel "a" as an oiling device.

The roller bearing unit of my invention consists in the retaining rings "r." Said rings are securely held in a fixed alinement by means of the separator pins "p" on which the antifriction rollers "t" are mounted and come in contact with cone pointed pressure rollers "e".

The rollers "e" transmit the load from the axle to the bearing or bushings and are loosely mounted in the retaining rings "r". The function of the cone pointed rollers "e" in connection with the pin rollers "t" is to avoid sliding friction of the rollers, as is shown by the arrows in Fig. 2 and Fig. 4 indicating the direction of the rollers as they rotate.

Many changes may be made in the form and size of the rollers, their bearing housings and details of connection without departing from my invention.

I claim,

1. The combination in a roller bearing, a series of spacing rollers "t" rotatably mounted on pins "p", said pins alternately spaced with pressure rollers "e" and secured in fixed alinement to retaining rings "r", forming an annular cage, a series of loosely mounted pressure rollers "e" within said cage so constructed adapted to rotate with said spacing rollers, substantially as and for the purpose described.

2. The combination in a roller bearing arranged in multiple units, a series of antifriction rollers "t" rotatably mounted on pins "p", said pins alternately spaced with pressure rollers "e" and secured in fixed alinement to retaining rings "r", forming annular cages; a series of loosely mounted pressure rollers "e" within said cages so constructed adapted to rotate with said spacing rollers, substantially as described.

In testimony whereof I affix my signature in the presence of two witnesses.

THOMAS W. OWEN.

Witnesses:
S. M. MILLER,
JOS. L. BAUMAN, Jr.